April 6, 1954  H. V. KINDSETH ET AL  2,674,366
BELT GUIDE AND TAKE-UP
Filed Oct. 11, 1951  3 Sheets-Sheet 3
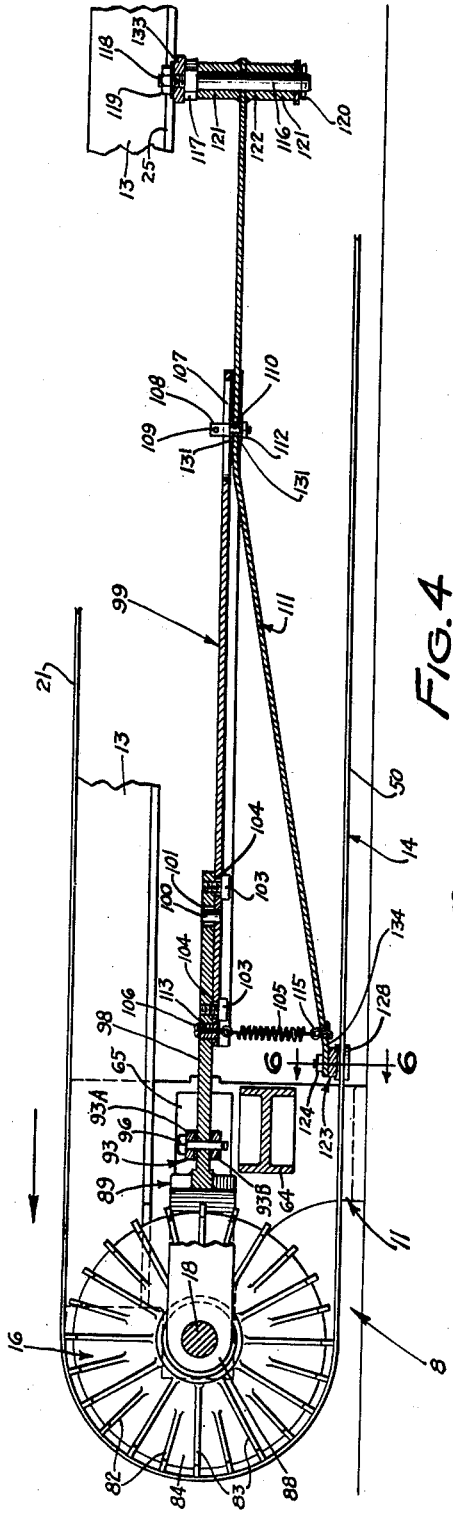
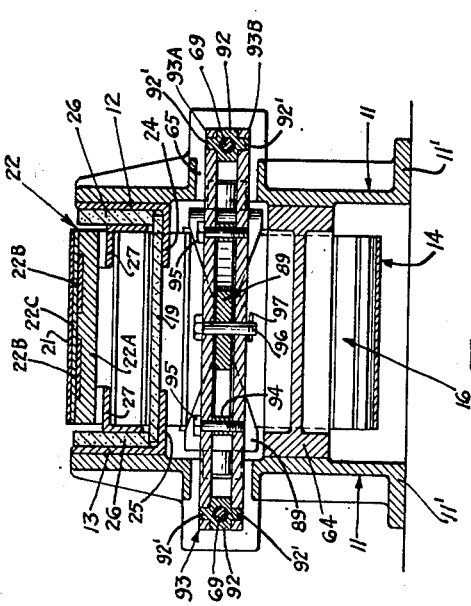
INVENTOR.
HAROLD V. KINDSETH
BY FRANK L. HOPKINS
Paul, Paul & Moore
ATTORNEYS

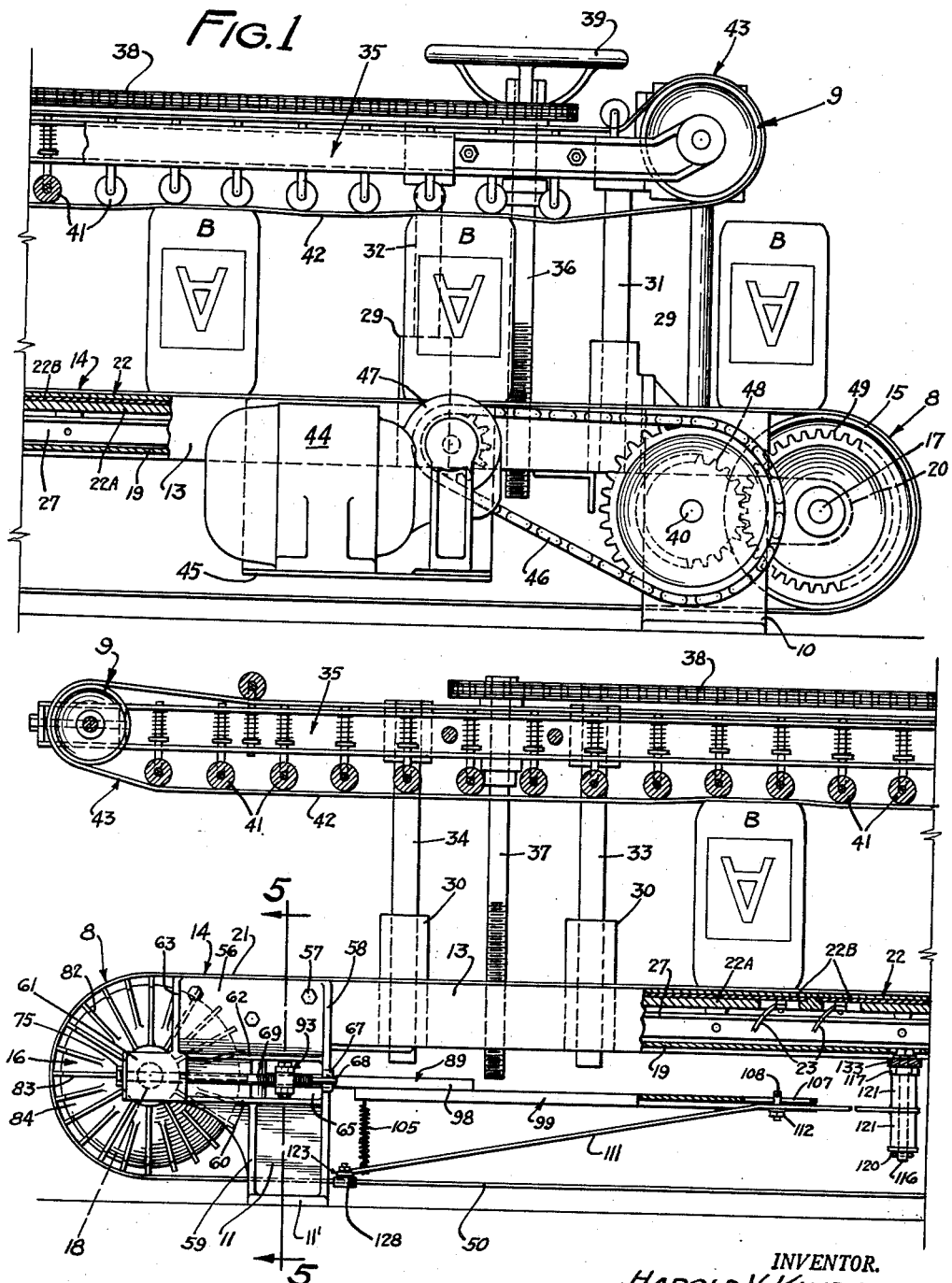

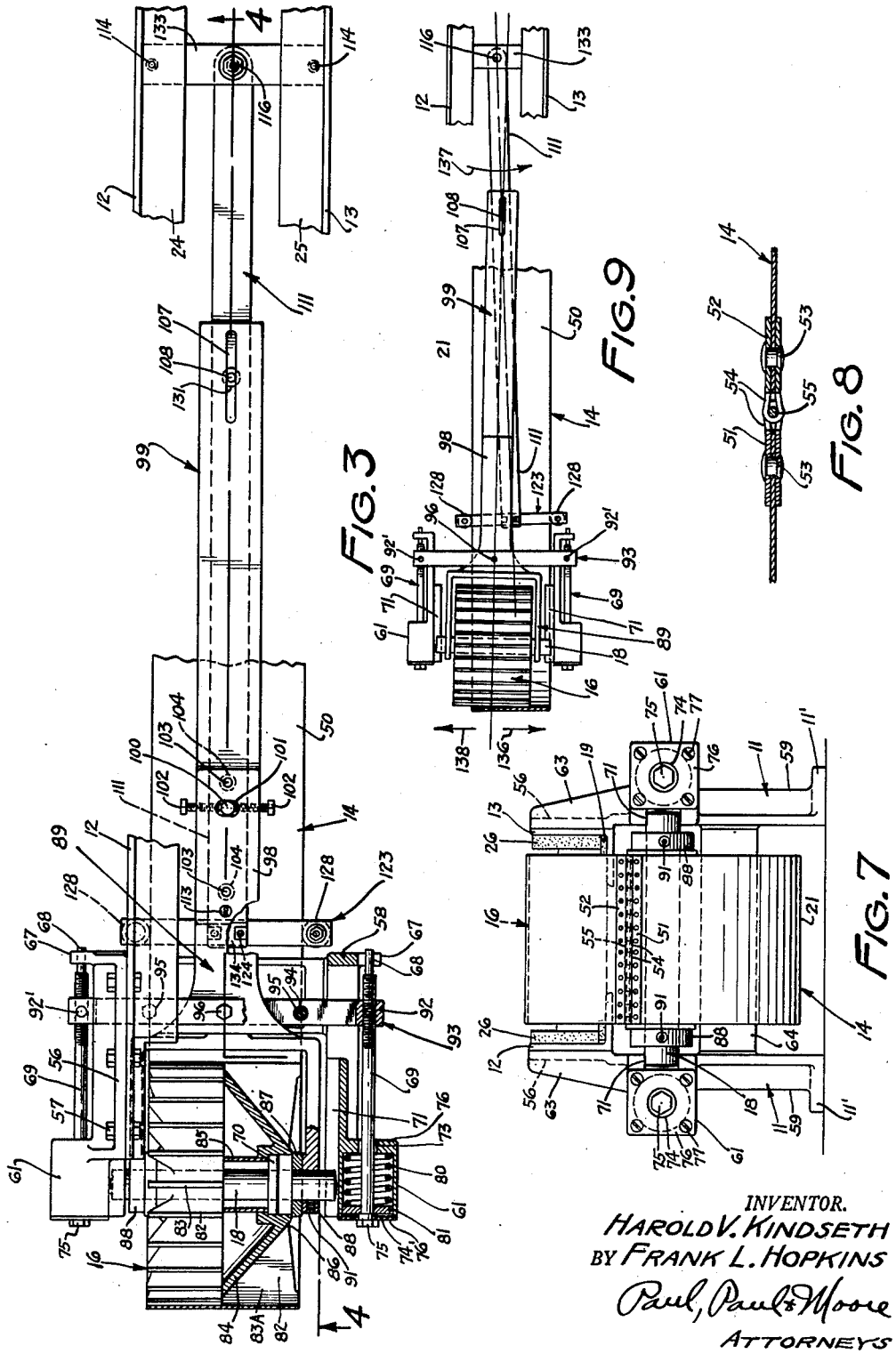

Patented Apr. 6, 1954

2,674,366

UNITED STATES PATENT OFFICE 2,674,366

BELT GUIDE AND TAKE-UP

Harold V. Kindseth and Frank L. Hopkins, Minneapolis, Minn., assignors to Bemis Bro. Bag Company, Minneapolis, Minn., a corporation of Missouri Application October 11, 1951, Serial No. 250,904

18 Claims. (Cl. 198—202)

This invention relates to new and useful improvements in belt guides and takeups, and more particularly to such a belt guide and takeup which will automatically adjust itself to insure the realignment of a belt which has commenced to deviate from its normal running position upon a pulley, and which will automatically take up any slack in the belt whenever the belt stretches or expands.

In the commercial use of endless belts upon cylindrical pulleys, difficulty is sometimes experienced in keeping a belt aligned with its supporting pulleys, as some belts may, for one reason or another, develop a tendency to run to one side of their supporting pulleys, and if not adjusted will sometimes slip completely from the pulley. This may cause undue wear on particular sections of the belt, as where the edges of the belt rub against guide members. Some belts may also stretch unevenly when in use, and may thus become disaligned, even when the belt is perfectly placed on the pulley. This has resulted in stretched belts, wear and tear on the pulleys and bearings, and has necessitated stoppage of the machine to adjust or replace the belt.

This problem of adjusting endless belts is particularly vexatious where an endless belt conveyor is being used to convey a series of objects from one place to another for operation thereon, as interruption of the conveying and flow of the articles means that other operations dependent thereon must wait with an attendant increasing cost for idle labor and machines.

It is therefore an object of this invention to provide a belt guide and takeup having means embodied therein for effecting automatic self-alignment of the belt on its pulleys.

It is a further object of the invention to provide a belt guide and takeup which will automatically realign a belt on a cylindrical pulley as the belt begin to disalign itself thereon.

It is a further object of the invention to provide a belt guide and takeup having means whereby the tension upon the belt will be maintained as the belt extends due to fatigue or expansion.

It is a further object to provide a belt guide and takeup having resilient spring means for automatically maintaining the belt at the proper operating tension during expansions and contractions thereof.

It is a further object to provide a belt guide and takeup having resilient means for maintaining tension in the belt, and whereby the tension in the belt may be varied, if deemed necessary.

It is a further object of the invention to provide a belt guide and takeup having resilient means for maintaining tension upon a belt as a belt expands and contracts and having means which prevents the placing of excess tension upon said belt.

It is a further object to provide a belt guide and takeup having means responsive to initial disalignment of an endless belt upon a pulley to automatically pivot said pulley about an axis vertical to the axis of rotation thereof to realign said endless belt, and to provide resilient means operable in conjunction therewith for maintaining the required tension in the belt.

Further objects of the invention reside in the construction of the tension springs and retaining covers therefor; the aligning yoke; the control tongue and the control arm therefor; and in the manner of supporting the control arm and in connecting the same with the control tongue and yoke.

The invention will be described with reference to the drawings in which corresponding numerals refer to the same parts and in which:

Figure 1 is a fragmentary front elevation of the receiving end of an illustrative endless belt conveyor partly in section, showing the driving means for the conveyor belt;

Figure 2 is a fragmentary front elevation of the discharge or tail end of the conveyor of Figure 1, showing the novel construction of the tail pulley;

Figure 3 is a top view of Figure 4, partly broken away and partly in section and showing details of the instant invention;

Figure 4 is a view taken on the line 4—4 of Figure 3, looking in the direction of the arrows;

Figure 5 is a view taken on the line 5—5 of Figure 2;

Figure 6 is a fragmentary view taken on the line 6—6 of Figure 4, showing the rollers which engage the side edges of the lower run of the belt to automatically guide it onto the tail pulley of the conveyor;

Figure 7 is a left-end elevation of Figure 2, showing the means for connecting together the ends of the belt;

Figure 8 is a fragmentary detail sectional view of the belt hinge shown in Figure 7; and Figure 9 is a diagrammatic plan view corresponding to the view shown in Figure 3, and showing in exaggeration the position of the endless conveyor as it commences to disalign itself from a cylindrical pulley.

Referring now to the drawings, and particularly to Figures 1 and 2, there is shown an endless conveyor for filled bags embodying the instant invention. This conveyor is of the type illustrated in the application of Harold V. Kindseth, Serial No. 25,876, filed May 8, 1948 and now abandoned, and reference is made thereto. It is to be understood that the description of this invention in connection with said endless conveyor is for the purposes of illustration only and it is within the contemplation and scope of this invention that it may be used with other types of endless conveyors. However, the conveyor of the type shown in application Serial No. 25,876, is of particular aptness for showing the setting of this invention, since the endless belt shown therein is of metal, adapted to be heated and therefore markedly expansible.

As best shown in Figure 1, the novel conveyor herein disclosed, is shown including an endless conveyor, generally designated by the numeral 8, comprising a supporting frame having a pair of identical supporting legs 10 at the receiving end thereof, only one of which is shown. A similar pair of supporting legs 11 are provided at the discharge end of the conveyor and cooperate with the legs 10 to support a pair of side rails 12 and 13. A second endless conveyor 9 is spaced above conveyor 8.

The side rails 12 and 13 are preferably of angle iron cross section, and may extend substantially the length of the endless belt 14 of the lower conveyor 8. The belt 14 is shown supported upon pulleys 15 and 16 mounted on shafts 17 and 18, respectively. The shaft 17 is shown supported in bearings provided in forwardly extending brackets 20 of the legs 10 of the machine, and shaft 18 is supported as will be hereinafter described.

Means is provided for heating the upper run 21 of the lower belt 14 and is shown comprising an electric heating element, generally designated by the numeral 22, comprising a base plate 22A, insulated heater strips 22B, and a top plate 22C. The heating element 22 extends substantially the length of the upper belt run 21, whereby said belt may be fairly heated. The top plate 22C of the heating element also serves to support the belt run 21 the major portion of its length, as will be understood by reference to Figures 1 and 2. Element 22 is provided with electrical conductors 23 to facilitate connecting it to a source of electric energy, not shown.

To confine the heat to the upper belt run 21 of the lower belt, an insulating panel 19 is shown secured to the inwardly directed flanges 24 and 25 of rails 12 and 13, and insulating panels 26 of similar material are secured to the inner faces of rails 12 and 13 by angle irons 27. The angle irons 27 are secured to the side rails 12 and 13 by suitable means such as bolts, not shown, and serve to support the heating element base plate 22A, as will be understood best with reference to Figure 5.

A plurality of upright cylindrical guides 29 and 30 are attached to the side rail 12 adapted to slidably receive guide rods 31—32, and 33—34, respectively, having their upper ends secured to a longitudinally extending frame member 35, partially shown in Figure 1. Threaded rods 36 and 37 are mounted for rotation in suitable guides provided in the frame 35 and are drivingly connected together by a chain drive 38, as is illustrated in Figures 1 and 2. The rod 36 is provided with a hand wheel 39 whereby the threaded rods 36 and 37 may readily be rotated to vertically adjust the frame 35, and therefore the upper conveyor 9, with respect to the upper run 21 of the lower belt 8. It is to be understood that the upper conveyor is disposed directly over the lower conveyor 8, and is supported on the longitudinally extending frame member 35.

As hereinbefore stated, the particular construction of the endless conveyor is not a feature of this invention, per se, and is illustrative only as to one type of conveyor with which it may be used, the particular conveyor described being an apt one for illustrative purposes since it utilizes a metal belt which, when subjected to heat, may elongate considerably and thus require adjustment of the belt to take up the slack therein. The present invention provides for automatically taking up such slack, as will subsequently be described.

The upper conveyor 9 forms no part of the present invention, and hence need not be described in further detail. It serves merely to provide an endless conveyor belt 43 which is operable in conjunction with the lower conveyor belt 14 to engage the ends of filled bags B, as illustrated in Figure 1, to thereby firmly press the closed bag end walls into sealing engagement with one another. In this connection a plurality of spring actuated rollers 41 are shown mounted upon frame 35 to constantly exert a downward pressure upon the lower run 42 of the endless belt 43. Belt 43 is driven from the lower conveyor 8, by suitable means, not shown.

The endless belts 14 and 43 are shown driven by a motor 44 mounted upon a base 45 which may be secured to frame member 13 by means not shown. The motor includes a chain drive 46 and a speed reducer 47. The chain drive 46 connects the speed reducer 47 to a shaft 40 which is provided with a pinion 48 shown meshing with a spur gear 49, secured to shaft 17 to which the pulley 15 is secured.

The two ends of the lower metallic conveyor belt 14 are connected together by hinge members 51—52, and are shown riveted to their respective belt ends by such means as rivets 53. The hinge members are provided with a series of spaced loops 54 adapted for interlocking engagement and having a pin 55 for pivotally connecting them together, as will be understood by reference to Figures 7 and 8.

The upright supporting legs 11 of the conveyor frame are preferably provided with floor contacting flanges 11', and extend upwardly and are provided at their upper ends with integral vertical plate-like portions 56, to the inner faces of which are attached the ends of side-rails 12 and 13 by bolts 57, as best shown with reference to rail 12 in Figure 2. The plate-like portions 56 are each provided with a vertical web 58 which extends downward along the rightward edge thereof, when viewed as shown in Figure 2. A second vertical web 59 extends upward along the leftward edge of leg 11 with reference to Figure 2, but terminates at horizontal web 60 which extends from approximately the midpoint of web 58 leftwardly past web 59 for a substantial distance in order to provide an extension for a spring housing 61. A second horizontal web 62 is disposed slightly above web 60, and a third vertical web 63 extends parallel to web 58 and along the opposite end of plate 56, terminating at horizontal web 62. The top portions of webs 58 and 63 are tapered as is best shown with reference to Figure 7. The various webs are for support and strength only and it is of course to be understood that other specific supporting structure may be used without departing from the spirit and scope of this invention.

The legs 11 are shown secured together by a suitable cross member 64 which is spaced upwardly from the floor so that the lower run 50 of the belt 14 may pass beneath it. A rectangular aperture 65 is provided in each leg 11 as may be seen with reference to Figures 2-5, which serves to permit movement of the ends of a takeup bar 93, as will be more fully explained hereinafter. A protruding ear 67 of flange 58 is slotted to receive the reduced end 68 of a takeup screw 69, one such screw being provided at each side of the machine, as shown in Figure 3.

The idler pulley 16 is journalled on shaft 18 which shaft rotates in bearings 70. The ends of shaft 18 are disposed in slideways 71, as shown in Figure 3. Positioned adjacent slideways 71 and extending outwardly therefrom are the tension spring housings 61 which are of cylindrical configuration and have their end walls 76 and 76' provided with apertures 73 and 74, respectively, for receiving the takeup screws 69. The end walls 76' are removably secured to the ends of their respective housings 61 by screws 77, shown in Figure 7.

A coil spring 80 is positioned in each housing 61, and each has one end seated against the integral end wall of its housing 61, and the opposite ends of said springs are seated against circular plates 81 retained on the ends of takeup screws 69, as shown in Figure 3, by the heads 75 thereof. Thus it may be seen that springs 80 are compressed when the takeup screws 69 are moved rightwardly with reference to Figure 3, and the circular plates 81 may then be drawn into housings 61 to the extent the heads 75 of screws 69 may disappear through apertures 74, when the belt is under proper tension. This is a desirable feature of the belt tensioning means, because it prevents over-tightening of the belt. In other words, when the belt is properly tensioned, the heads 75 of the take-up rods 69 are drawn into the apertures 74, whereby they cannot readily be manipulated with a wrench or tool.

Idler pulley 16 is shown provided with an enlarged hub 84, constructed as best shown in Figure 3. Hub 84 is journalled on shaft 18 by bearings 70, and is preferably shaped as shown in Figure 3, and simulates two frustrums placed base-to-base along a vertical median plane. A hollow sleeve 85 is secured in hub 84 and is seated against bearings 70. Bearings 70 are in turn separated from the end portions 88 of the spaced arms of an idler yoke 89 by spacers 87. Hub 84 has a plurality of radially extending fins or spokes 82, the outer edges of which cooperate to provide a pulley face for engaging and supporting the tail end of belt 14. The preferred shape of the fins or spokes 82 is shown in Figure 3, wherein it will be seen that the face width of pulley 14 is slightly greater than the width of the belt.

The spacers 87 serve to separate bearings 70 from the ends of the arms of idler pulley yoke 89, the ends of shaft 18 being securely positioned in ends 88 of yoke 89 by set screws 91. One takeup screw 69 is provided for each end of takeup bar 93 and one is positioned in each housing 61 as shown. Each takeup screw 69 is also engaged with a swiveled nut 92 of the cross-section shown best in Figure 5, the protuberances 92' of nuts 92 being positioned in apertures provided in the takeup bars 93, as shown in Figure 5.

Each takeup bar 93 comprises two identical members 93A and 93B, which are separated by spacers 94 which are in turn maintained in place by bolts 95. A yoke pivot pin 96 extends through apertures in the center of members 93A and 93B and is shown provided with a cotter pin 97 for maintaining it in position. The pivot pin 96 also passes through an aperture in the arm 98 of yoke 89, whereby the yoke is pivoted to the member 93, as will readily be understood by reference to Figures 4 and 5.

Arm 98 of yoke 89 has one end of an elongated member 99 adjustably secured thereto, as shown in Figures 3 and 4. To thus secure member 99 to arm 98, member 99 is provided with an upwardly extending stud 100 which extends through an elongated slot 101 in arm 98. Opposed adjusting screws 102 are mounted in arm 98 and have their terminals entering the ends of slot 101 to engage stud 100 to adjustably secure the stud therein (see Figure 3). Member 99 is secured in adjusted position to stem 98 by cap screws 103 received in oversize apertures 104 in member 99, and having their terminals received in threaded engagement with arms 98. A coil spring 105 is shown having a cotter pin 106 at its upper end for suspending it from arm 98, the cotter pin 106 being supported in a stud 113 threadedly received in aligned apertures provided in arm 98 and member 99. Hence, member 99 may pivot about threaded stud 113 relative to arm 98, the adjusting screws 102 providing for fine or vernier adjustment between arm 98 and member 99, and cap screws 103 securely locking said parts in adjusted position.

The end of member 99 opposite that secured to yoke 89 is provided with a longitudinally extending slot 107 adapted to slidably receive a stud 108 having a reduced end portion 110 fixed in an aperture provided in a control arm 111 by a nut 112 and a pair of spacing washers 131, as best illustrated in Figure 4. A hole 109 is preferably provided in stud 108 for the reception of a suitable tool or instrumentality for preventing relative turning of the stud when securing it in control arm 111. As best illustrated in Figure 4, member 99 is preferably of channel cross-section to provide adequate stiffness, and arm 111 may be of strap cross-section, as shown in Figure 4.

One end of arm 111 is pivoted to the central portion of a cross member 133 having its ends secured to the horizontal webs or flanges 24 and 25 of the side rails 12 and 13, respectively, of the main frame, by a pivot pin or stud 116. See Figures 3 and 4. Pivot pin 116 is shown having an enlarged hexagonal portion 117 adjacent its upper end to provide a shoulder. A threaded terminal 118 extends upwardly from shoulder 117 and is received in an aperture in cross member 133 and secured therein by a nut 119, thereby to fixedly secure the pivot pin 116 to the cross member 133, as clearly illustrated in Figure 4. To provide adequate support for control arm 111 on stud 116, axially aligned bearing elements 121 are secured thereto as by welding, and are apertured to receive pivot studs 116. A cotter pin 120 is fixed in the lower end of stud 116 to retain arm 111 thereon.

Control arm 111 extends horizontally from pivot stud 116 in a direction towards the discharge end of the conveyor, as best shown in Figure 4 and is inclined downwardly and has its lower end 134 secured to a transversely disposed control bar 123 by such means as bolts 124. The lower end 134 of control arm 111 is shown suspended from spring 105 by means of a cotter pin. Opposed end portions of the control bar 123 are preferably recessed, as shown at 125 in Figure 6, and have apertures 126 and 127 therein for receiving the supporting studs of suitable guide rollers 128 which are fixed to the recessed end portions of the cross bar. It will be noted by reference to Figure 6 that aperture 127 is elongated longitudinally of the bar, whereby the guide roller 128 secured therein may be longitudinally adjusted on the bar to vary the spacing between the two guide rollers 128 to the width of the belt to be guided thereby.

Thus, it may be seen that in the operation of the conveyor belt takeup illustrated herein the takeup bolts 69 may be adjusted in nuts 92 so as to place tension on springs 80 and thus put tension on the takeup bar 93 and on yoke 89 and hence on pulley 16 and belt 14. The bolts 69 are usually adjusted equally to provide an equivalent tension on each of springs 80 so as to take up all slack in the belt and align the belt 14 with reference to pulleys 15 and 16. It is to be noted that springs 80 cannot be placed under excessive tension since the heads 75 of the takeup bolts 69 will eventually disappear in apertures 74, when said bolts are rotated to tension the springs, whereby they cannot be gripped by a wrench when the springs 80 attain a certain tension.

This provides a safety factor and limits the amount of tension that can be placed on springs 80 thereby to prevent over-tensioning belt 14. Bar 93, when heads 75 are adjusted equally will remain at substantially right angles to rails 12 and 13, unless one spring 80 is compressed relatively more than the other. The pivotal mounting of nuts 92 in bar 93 allows for cocking or tilting of bar 93 with reference to takeup screws 69. Under normal operating conditions, however, the bar 93 is perpendicular to rails 12 and 13, and the yoke 89 will pivot thereon about the axis of stud 96.

Shaft 18, as hereinbefore stated, is fixed in the arms 88 of yoke 89, and pulley 16 rotates thereon by virtue of bearings 70. The yoke 89, as previously stated, may be adjusted with relation to member 99 by means of screws 103, stud 100, adjusting screws 102 and stud 113. This will be readily understood by reference to Figures 3 and 4, wherein it is seen that when screws 103 are loosened, member 99 may pivot about pivot 113 with respect to arm 98, as the adjusting screws 102 are cooperatively tightened and loosened. When member 99 has been properly adjusted on arm 98, screws 103 are tightened to immovably position member 99 on arm 98. Slot 107 allows stud 108 to reciprocate therein in response to the movement of member 99, caused by elongation of belt 14. Spring 105 serves to exert tension to maintain the control arm 111 in the position shown in Figure 4, and thus prevent any excess weight on the bottom run 50 of belt 14.

Rollers 128 constantly engage the opposed edges of the lower run 50 of belt 14. Consequently, should the belt tend to wander to one side or the other on pulley 16, as for example, in the direction indicated by the arrow 136 in Figure 9, it will cause lateral pressure on one of the rollers 128 and thereby cause actuation of control arm 111 and cross bar 123 in the direction indicated by arrow 137. This will cause stud 108 to move in a lateral direction and thereby laterally swing member 99 to effect lateral movement of yoke 89 about stud 96, whereby pulley 16 is bodily swung in the direction indicated by arrow 138 in Figure 9. As yoke 89 pivots about stud 96 the ends of shaft 18 axially move in slideways 71, as will best be understood by reference to Figure 3.

The novel belt mounting herein disclosed assures accurate alignment of the belt with its supporting pulleys at all times. This is accomplished automatically as a result of the rollers 128 on the cross bar 123 constantly engaging the opposed side edges of the lower run of belt 14, as shown in Figure 6. If, for some reason, the belt should tend to run to one side of the tail pulley 16, the control arm 111 is instantly actuated to cause the yoke 89 to guide the belt back onto the pulley 16, as shown in Figure 9.

It will also be noted by reference to Figures 3 and 4 that any elongation in the belt 16 is immediately taken up by the spring mounting of the pulley 16, as a result of springs 80. As hereinbefore stated, in a conveyor such as the one herein disclosed, the upper run 21 of belt 16 is heated by contact with the heating element 22, shown in Figure 2, which may cause the belt to elongate because of being constructed of metal. The springs 80 automatically maintain the belt under constant operating tension at all times, regardless of temperature changes.

Another important phase of the present invention resides in the self-cleaning feature of the tail pulley 16, whereby foreign matter cannot accumulate on the periphery of the pulley and cause excessive strains to develope therein. The adjustable mounting of yoke 89 makes it possible to quickly accurately align the belt with the tail pulley 16, when the conveyor is originally set up, by simply manipulating the adjusting screws 102 shown in Figure 3, as hereinbefore described.

The foregoing detailed description has been given for clearness of understanding only, and no unnecessary limitations should be understood therefrom, but the appended claims should be construed as broadly as permissible in view of the prior art.

We claim as our invention:

1. In a conveyor of the class described, an elongated frame, a drive pulley mounted at one end of said frame, a yoke mounted for pivotal movement about a vertical axis at the opposite end of the frame, a tail pulley supported in said yoke, a belt threaded around said pulleys, said yoke having an elongated arm, a control member having one end pivoted to the machine frame between said pulleys and having a pair of laterally spaced rollers at its opposite end mounted to be engaged by the opposed side edges of the belt, and means operatively connecting said arm to said control member intermediate of its ends, whereby swinging movement of the control member caused by the lower run of the belt deviating from its normal course, will impart pivotal movement to said yoke and cause said tail pulley to be bodily swung to a position to automatically guide the belt to its normal aligned position on said pulley.

2. A conveyor according to claim 1, wherein means is provided for automatically maintaining the belt at a constant operating tension.

3. A conveyor according to claim 1 wherein spring means operatively connects said yoke to the machine frame and constantly urges it in a direction to maintain said belt at operating tension.

4. In a conveyor of the class described, an elongated supporting frame having a drive pulley mounted at one end thereof, a yoke mounted at the opposite end of said frame and adapted for pivotal movement about a vertical axis, a tail pulley rotatably supported in said yoke and cooperating with the drive pulley to support an endless belt, said yoke having an elongated arm extending in a direction towards the drive pulley an elongated connecting member having one end pivoted to said arm, a control member having one end pivoted to the machine frame, and having a cross member secured to its opposite end, a pair of guide rollers mounted at the ends of said cross member for engagement with the opposed side edges of the belt and whereby when said control member is laterally oscillated as a result of the belt deviating from its normal course, pivotal movement is imparted to said yoke to bodily swing the tail pulley in a direction to cause the belt to return to its normal aligned position thereon.

5. In a conveyor of the class described, an elongated supporting frame having a drive pulley mounted at one end thereof, a yoke mounted at the opposite end of said frame and adapted for pivotal movement about a vertical axis, a tail pulley rotatably supported in said yoke and cooperating with the drive pulley to support an endless metallic belt, said yoke having an elongated arm extending in a direction towards the drive pulley, an elongated connecting member having one end adjustably secured to said arm and having an elongated opening in its opposite end portion, a control member having one end pivoted to the machine frame, and having a cross member secured to its opposite end, a pair of guide rollers mounted at the ends of said cross member for engagement with the opposed side edges of the belt, said control member having an upright stud secured thereto and traversing the elongated opening in said connecting member whereby when said control member is laterally oscillated as a result of the belt deviating from its normal course, pivotal movement is imparted to said yoke to bodily swing the tail pulley in a direction to cause the belt to return to its normal aligned position thereon.

6. A conveyor according to claim 5, wherein the connecting member is adjustably secured to the arm of said yoke whereby the tail pulley may be laterally adjusted relative to the normal travel path of the belt to maintain alignment between belt and pulleys.

7. A conveyor according to claim 5, wherein the yoke arm has a transversely disposed elongated opening therein for the reception of a stud having one end fixed in said connecting member, and opposed adjusting screws being mounted in the yoke arm with their terminals entering said elongated opening and engaging opposite sides of said stud to facilitate adjustably positioning the yoke with said member.

8. In a conveyor of the class described, an elongated supporting frame having a drive pulley at one end and a tail pulley at its opposite end, an endless conveyor belt on said pulleys, a yoke for rotatably supporting the tail pulley, a pivotal support for said yoke including a vertically disposed pivot pin carried in a member disposed transversely of the belt, a pair of rods each having one end adjustably secured to said cross member and having their opposite ends operatively connected to spring elements supported in the machine frame, whereby said rods constantly exert a force on said yoke to urge it in a direction to tension the belt, and whereby elongation of the belt is automatically taken up by the tail pulley, said yoke having an elongated arm extending in a direction towards the drive pulley, a control member having one end pivoted to the machine frame and having means at its opposite end positioned to be engaged by the opposed side edges of the belt, and means operatively connecting the yoke arm to said control member, whereby when said member is laterally oscillated as a result of the belt momentarily wandering from its normal course, said control member will impart pivotal movement to said yoke in a direction to cause the belt to automatically return to its normal aligned position on said pulleys.

9. In a conveyor of the class described, an elongated supporting frame having a drive pulley at one end and a tail pulley at its opposite end, an endless flat metallic belt on said pulleys, a yoke for rotatably supporting the tail pulley, a pivotal support for said yoke including a vertically disposed pivot pin carried in a member disposed transversely of the belt, a pair of rods each having one end adjustably secured to said cross member and having their opposite ends operatively connected to suitable spring elements carried by the machine frame and whereby said rods constantly exert a force on said yoke to urge it in a direction to automatically maintain the belt at operating tension regardless of variations in the length thereof caused by temperature variations, means whereby said rods may be relatively rotated to vary the operating tension of said springs, said yoke having an elongated arm extending in a direction towards the drive pulley, a control member having one end pivoted to the machine frame and having means at its opposite end adapted to be engaged by the opposed side edges of the lower run of the belt, and means operatively connecting the yoke arm to said control member, whereby when said member is laterally oscillated as a result of the belt momentarily wandering from its normal course, said control member will impart pivotal movement to said yoke in a direction to cause the tail pulley to automatically return the belt to its normal aligned position on said pulleys.

10. In a conveying apparatus of the class described, an elongated supporting frame, a drive pulley mounted at one end thereof, a yoke mounted for swinging movement about a vertical pivot located at the opposite end of the frame, a tail pulley mounted in said yoke and cooperating with the drive pulley to support an endless flat belt, an elongated member having one end pivotally connected to the supporting frame and having its opposite end engaged with a run of the belt, and the intermediate portion of said member being operatively connected to said yoke, whereby lateral movement of the belt, when the belt momentarily wanders from its normal path on said pulleys, will automatically actuate the yoke to bodily laterally swing the tail pulley in a direction to return the belt to its aligned position on said pulleys.

11. A conveyor according to claim 10, wherein the tail pulley is mounted for relative longitudinal movement in the machine frame, and a yieldable pressure is constantly exerted thereon to automatically maintain the belt at operating tension.

12. In a conveyor of the class described, an elongated frame, a drive pulley mounted at one end of said frame, a yoke at the opposite end of said frame mounted for pivotal movement about a vertical axis, a tail pulley rotatably supported in said yoke, a metallic belt threaded around said pulleys, said yoke having an elongated arm, a control member having one end pivoted to the machine frame and having a pair of laterally spaced rollers secured to its opposite end below said arm and positioned to be engaged by the opposite side edges of the belt, and means operatively connecting said arm to said control member intermediate of its ends, whereby swinging movement imparted to said control member when it momentarily deviates from its normal course, will impart pivotal movement to said yoke and bodily swing the tail pulley to a position whereby the belt is immediately restored to its normal aligned position on said pulley.

13. A conveyor according to claim 12, wherein the yoke is mounted for relative longitudinal movement in the frame and spring elements are provided for constantly urging the yoke in a direction to automatically maintain the belt at operating tension.

14. In a conveyor of the class described, a supporting frame, a drive pulley at one end of said frame and a tail pulley at the opposite end thereof, an endless metallic belt on said pulleys, an endless belt mounted over said metallic belt whereby articles may be conveyed by the adjacent runs of said belts, means for driving said belts, a yoke for supporting the tail pulley, said yoke being mounted for pivotal movement about a vertical axis and being movable longitudinally of the frame to maintain the lower metallic belt at operating tension, a control member having one end movably supported in the machine frame and having its intermediate portion operatively connected to said yoke, means at the free end of said member positioned to be engaged by the opposed edges of the lower belt, when the belt wanders laterally from its normal course, whereby said control member is oscillated to impart swinging movement to the yoke thereby to bodily swing the tail pulley to a position to cause it to return the belt to its normal aligned position with the drive and tail pulleys.

15. A conveyor according to claim 14, wherein means is interposed between the yoke and said control member for laterally adjusting the position of the tail pulley relative to the control member to assure accurate alignment of the belt and pulleys under normal operating conditions.

16. In a conveyor of the class described, an elongated frame, a drive pulley mounted at one end of said frame, a member mounted for longitudinal movement in said frame at the opposite end thereof and supporting a tail pulley, an endless metallic belt mounted on said pulleys, a belt tensioning device operatively connected to said longitudinally movable member, a pair of tension rods each having one end adjustably connected to said member, spring elements coiled about the opposite ends of said rods and each having one end seated against a fixed portion of the machine frame, the adjacent ends of said rods having means thereon for receiving a tool whereby they may be relatively rotated to vary the effective tension of said spring elements, and whereby the longitudinally movable member is actuated to vary the tension in the belt, the tool-engaging ends of said rods being supported in apertures provided in fixed wall portions of the supporting frame, into which apertures the tool-engaging ends of said rods may recede, when said rods are operated to tension the belt, thereby to prevent overtensioning the belt.

17. A conveyor according to claim 16, wherein the spring elements are supported in fixed housings provided in the machine frame, and each housing having an apertured end wall for receiving the tool-engaging ends of said tension rods, and whereby the tool-engaging ends of the rods may recede into said housings to prevent overtensioning the belt.

18. A conveyor according to claim 16, wherein the corresponding ends of said tension rods are rotatably supported in suitable guides, and the opposite ends of said rods traverse the end walls of said fixed housings, and the adjacent ends of said rods being provided with heads for the engagement of a tool to facilitate rotating said rods to vary the tension in the belt, the tool-engaging heads of said rods being receivable in the openings in the adjacent end walls of the housings, thereby to prevent overtensioning of the belt.

References Cited in the file of this patent

UNITED STATES PATENTS

| Number | Name | Date |
|---|---|---|
| 452,191 | Oliver | May 12, 1891 |
| 769,850 | Thompson | Sept. 13, 1904 |
| 1,545,309 | Davis et al. | July 7, 1925 |
| 1,770,957 | Veale | July 22, 1930 |
| 2,023,611 | Neuman | Dec. 10, 1935 |
| 2,075,111 | Gulliksen et al. | Mar. 30, 1937 |

FOREIGN PATENTS

| Number | Country | Date |
|---|---|---|
| 243,546 | Great Britain | Dec. 3, 1925 |